UNITED STATES PATENT OFFICE.

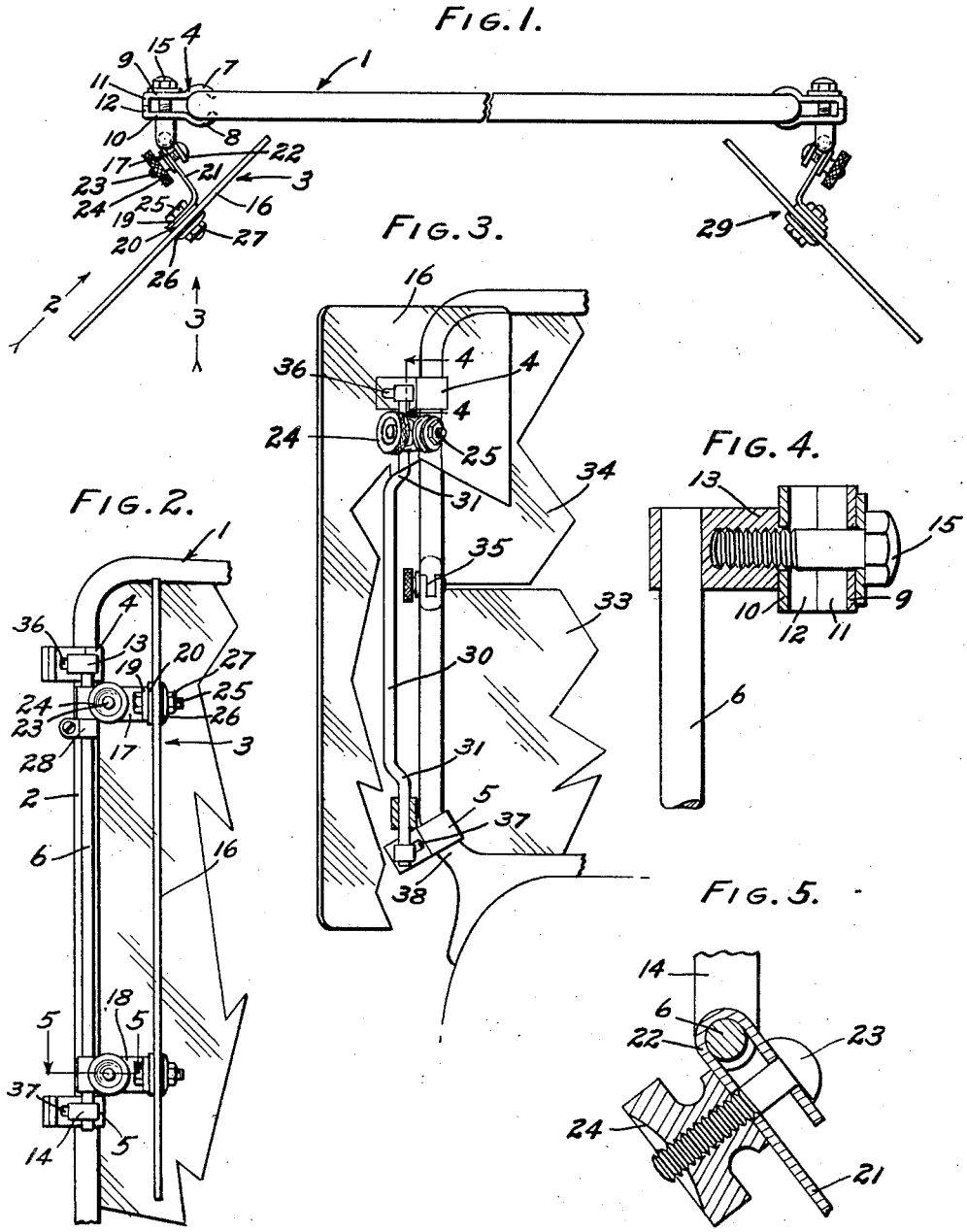

ERNEST C. HILLMAN, OF LOS ANGELES, CALIFORNIA.

AUXILIARY WINDSHIELD.

1,339,889.  Specification of Letters Patent.  Patented May 11, 1920.

Application filed May 5, 1919. Serial No. 294,952.

*To all whom it may concern:*

Be it known that I, ERNEST C. HILLMAN, a citizen of the United States, residing at Los Angeles, in the county of Los Angeles and State of California, have invented new and useful Improvements in Auxiliary Windshields, of which the following is a specification.

My invention relates to auxiliary wind-shields, and consists of the novel features herein shown, described and claimed.

Figure 1 is a top plan view of a main wind-shield having an auxiliary wind-shield at each side in accordance with the principles of my invention.

Fig. 2 is a fragmentary elevation looking in the direction indicated by the arrow 2 in Fig. 1.

Fig. 3 is a fragmentary elevation looking in the direction indicated by the arrow 3 in Fig. 1.

Fig. 4 is an enlarged sectional detail on the line 4—4 of Fig. 3.

Fig. 5 is an enlarged sectional detail on the line 5—5 of Fig. 2.

The main wind-shield 1 has a vertical side bar 2 and my auxiliary wind-shield 3 is adjustably mounted upon the vertical side bar 2.

The details of the auxiliary wind-shield 3 are as follows:

Clamps 4 and 5 are connected by a pivot bar 6. The clamp 4 comprises mating members having curved jaws 7 and 8 adapted to embrace the side bar 2, clamping plates 9 and 10 extending from the curved jaws and spacing lips 11 and 12 extending from the opposite ends of the plates 9 and 10 from the jaws 7 and 8.

The clamp 5 is identical in construction with the clamp 4. The pivot rod 6 has a head 13 fixed upon its upper end and a head 14 sliding upon its lower end, a clamp screw 15 is inserted through the clamping plate 9, through the clamping plate 10 and tapped into the head 13.

In a like manner the head 14 is connected to the clamp 5. The pivot bar 6 extends backwardly from the clamps 4 and 5. The auxiliary wind-shield glass 16 is connected to the pivot rod 6 by clamping brackets 17 and 18. The clamping bracket 17 consists of an attaching plate 19 fitting against a felt washer 20, an arm 21 extending from the plate 19 substantially at right angles, a U-clamp 22 extending from the arm 21 around the pivot rod 6, a clamping bolt 23 inserted through the U-clamp 22 and the knurled nut 24 upon the outer end of the bolt so that when the nut is tightened the clamp 22 will pinch the pivot rod 6.

A bolt 25 is inserted through the attaching plate 19, through the felt washer 20, through the glass 16, through a second felt washer 26 and through a nut 27 so as to rigidly clamp the glass 16 to the bracket. The clamping bracket 18 is identical in construction with the clamping bracket 17 and a set collar 28 is adjustably mounted upon the pivot rod 6 to adjust the bracket 17 upwardly and downwardly upon the rod.

The brackets 17 and 18 extend backwardly and inwardly from the rod 6 so that the glass 16 normally stands at an angle of 45° relative to the main wind-shield 1 and so that the glass 16 may be swung inwardly and outwardly upon the rod 6 as a pivot and so that the parts may be adjusted and clamped as desired.

The auxiliary wind-shield 29 is identical in construction with the wind-shield 3 except that the parts are made right and left.

In Fig. 2 I have shown the pivot rod 6 straight. In Fig. 3 I have shown a pivot rod 30 with offset bends 31 so as to avoid the necessity of having the set collar 28.

In Fig. 2 I have shown the main wind-shield 1 with a solid glass and straight side bar 2. In Fig. 3 I have shown a main wind-shield comprising the lower section 33 and the upper section 34 connected by a clamping hinge 35.

The clamps 4 and 5 have elongated openings 36 and 37 through the plates 9 and 10 to receive the bolts 15 so as to provide some adjustment for the rod 6 and the rod 30 relative to the side bar of the main wind-shield and in Fig. 3 I have shown the clamp 5 tilted relative to the pivot rod 30 as required to apply the clamp to a bend 38 in the wind-shield side bar.

Various changes may be made without departing from the spirit of my invention as claimed.

I claim:

An auxiliary wind-shield comprising the combination with the side bar of a main wind-shield, of a pivot rod, heads on the pivot rod, clamping members fitting against the heads and adapted to engage the side bar, clamping screws inserted through the clamping members into the heads, clamping brackets adjustably mounted upon the pivot rod, and a glass carried by the clamping brackets.

In testimony whereof I have signed my name to this specification.

ERNEST C. HILLMAN.